Patented May 18, 1954

2,678,932

UNITED STATES PATENT OFFICE 2,678,932

PROCESS FOR IODINATING KETO-STEROIDS AND PRODUCTS PRODUCED THEREBY

Johannes S. Buck, Glenmont, and Raymond O. Clinton, North Greenbush, N. Y., assignors to Sterling Drug Inc., New York, N. Y., a corporation of Delaware No Drawing. Application August 29, 1951, Serial No. 244,256

18 Claims. (Cl. 260—397.3)

This invention relates to a new method for introducing iodine into the alpha-position of a carbonyl compound. The new method comprises heating said carbonyl compound with elementary iodine and an epoxide.

The invention is particularly adapted to the iodination of a keto-steroid in a position alpha to the keto group wherein the alpha carbon atom to be substituted by iodine bears at least two hydrogen atoms. The method comprises heating said keto-steroid with elementary iodine and an epoxide,

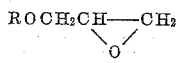

wherein R is a hydrocarbon radical of from 1 to 8 carbon atoms. If more than one keto group is present in the steroid, a plurality of iodine atoms may be introduced.

One aspect of the invention relates to a new method for introducing an iodine atom into the 21-position of a 20-keto-steroid. The 21-iodo-20-keto-steroids thus formed are particularly useful as intermediates in the preparation of 21-hydroxy or -acyloxy-20-keto-steroids which are in turn useful as cortical hormones or as intermediates for the preparation of cortical hormones. The 21-hydroxy or -acyloxy-20-keto-steroids can be obtained from the 20-keto-steroid without isolation of the intermediate 21-iodo compound.

Any steroid having a side chain of at least two carbon atoms in the 17-position, a keto group in the 20-position and at least two hydrogen atoms in the 21-position can be used as the starting material in the new process for introducing an iodine atom in the 21-position, although other changes may take place in the molecule if groupings are present, other than the 20-keto group, which are susceptible to reaction with the reagents employed, that is, with the iodine or the epoxide. Such additional groupings include additional keto groups and active halogen atoms. Steroids which can be used as starting materials include allopregnan-3β-ol-20-one; Δ5-pregnen-3β-ol-20-one; Δ5,16-pregnadien-3β-ol-20-one; progesterone; pregnan-3α,17α-ol-11,20-dione; pregnane-3,20-dione; pregnane-3α,12α-diol-20-one; pregnane-3,11,17-triol-20-one; 17-hydroxyprogesterone; pregnan-3-ol-11,20-dione; and the like. If the steroid has one or more hydroxy groups, they can be esterified if desired. The starting 20-keto-steroid can also be monosubstituted in the 21-position. This substituent can be an alkyl group or an activating organic residue such as acyloxy, carbalkoxy or cyano. The new process thus provides a method of introducing a second functional group into the 21-position.

The process is carried out by heating the 20-keto-steroid with elementary iodine and an excess of an epoxide,

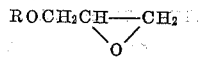

wherein R is a hydrocarbon radical having from 1 to 8 carbon atoms, in the presence of an anhydrous polar organic solvent.

In the formula of the epoxide,

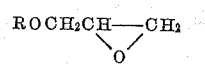

R represents a hydrocarbon radical having from 1 to 8 carbon atoms and therefore can be an alkyl group, such as methyl, ethyl, propyl, isopropyl, butyl, hexyl and octyl; an alkenyl group, such as allyl, pentenyl and octenyl; a cycloalkyl group, such as cyclopentyl, cyclohexyl and lower-alkylated derivatives thereof; an aralkyl group, such as benzyl and phenethyl; or an aryl group, such as phenyl, tolyl and xylenyl. Representative of the epoxides which can be employed are isopropyl glycidyl ether, butyl glycidyl ether, ethylbutyl glycidyl ether, phenyl glycidyl ether and allyl glycidyl ether.

By a polar organic solvent is meant a solvent composed of organic molecules containing, besides carbon and hydrogen, also oxygen and/or nitrogen, and possessing an appreciable dipole moment. It is preferable to choose a solvent which will not react to an appreciable extent with the iodine, the epoxide or the steroid used in the process. Appropriate solvents are readily apparent to the skilled chemist, and these include, for example, lower alkanols, lower fatty acids and aliphatic nitro compounds. On the other hand, ketonic solvents bearing active hydrogen atoms in the alpha-position are undesirable since they would tend to take up the iodine. Also primary or secondary amine solvents are to be avoided because of their property of opening the oxide ring of epoxides to form amino-alcohols. Alcohols will also react with epoxides to form hydroxy-ethers, but only do so in the presence of an acid catalyst; therefore alcohol solvents in the absence of acid are satisfactory in the new process. The following solvents have been found to be particularly valuable as the polar organic solvent: ethanol, propanol, acetic acid, propionic acid and nitroethane. It is important that the solvent be essentially anhydrous.

The temperature at which the reaction mixture is heated should be between about 50° C. and 150° C., conveniently at the boiling temperature of the polar organic solvent used. Temperatures lower than the boiling temperature can be used if adequate mixing of the reaction mixture is provided. Temperatures higher than the boiling temperature can be used if the reaction is carried out under super-atmospheric pressure. The reaction mixture is heated for a period ranging from several minutes to several hours, and the end of the reaction is indicated by disappearance of the iodine color. The 21-iodo-20-keto-steroid, since its chief usefulness is as an intermediate in the preparation of a 21-hydroxy or -acyloxy compound, need not be isolated but can be converted in the crude form to the 21-hydroxy compound by heating with an alkali metal hydroxide, carbonate or bicarbonate, or to the 21-acyloxy-steroid by heating with a metallic acylate, MOR′, where M represents an equivalent of a metal ion or ammonium, and R′ is an acyl radical derived preferably from a lower-fatty carboxylic acid. A convenient specific method comprises heating a solution of the crude 21-iodo-20-keto compound with potassium acetate in acetone solution. The potassium acetate can be formed in situ from acetic acid and potassium carbonate or bicarbonate.

The chemical reactions taking place may be represented as follows, using pregnan-3-ol-20-one as exemplary starting material:

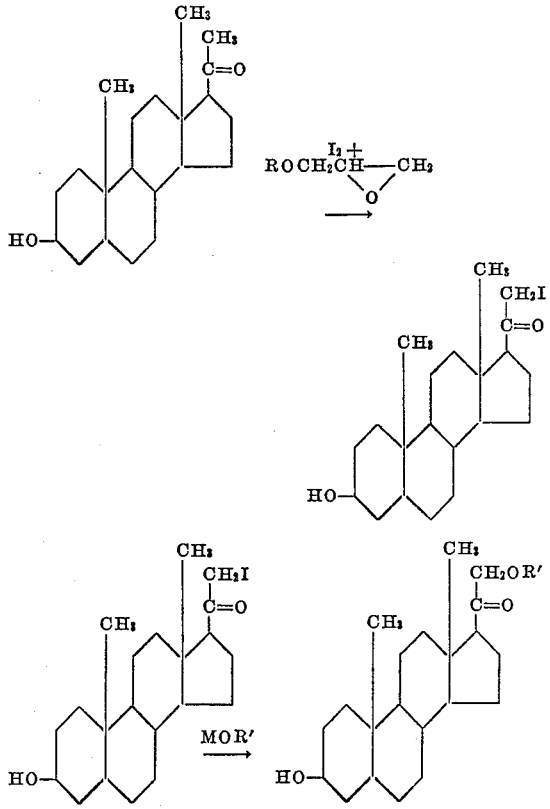

Ordinarily one mole of iodine is sufficient to complete the iodination of the 21-position of a 20-keto-steroid. In some cases, however, if other groupings reactive with the iodine are present in the steroid molecule, as, for example, a hydrogen atom activated by a second keto-group in the molecule, an excess of iodine may be required to complete the reaction. For example, a 3-keto-steroid saturated in ring A is iodinated in the 4-position if the steroid belongs to the normal series and in the 2-position if the steroid belongs to the allo series. These facts are pertinent to another aspect of the invention which relates to a process for simultaneously iodinating in the 21-position and the 4-position a 3-keto-steroid of the normal series having an aceto group in the 17-position and saturated in the 4,5-position, and to new products obtained thereby.

The substance used as starting material can be any 3-keto-steroid of the normal series having an aceto group in the 17-position and having the 4,5-position saturated. By a steroid of the normal series is meant a steroid wherein the methyl group at the 10-position and the hydrogen atom at the 5-position are in the cis relationship. Double bonds can be present in other parts of the nucleus, as well as additional functional groups, such as an 11-hydroxy group, an 11-keto group, a 12-hydroxy group, a 12-keto group, a 17-hydroxy group or a combination of more than one of these groups.

The di-iodination process is most conveniently carried out by heating the 3-keto-17-aceto-steroid with about two moles of iodine and at least about two moles of an epoxide,

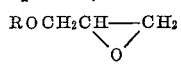

in the presence of a lower fatty acid having from 2 to 3 carbon atoms, i. e. acetic acid or propionic acid. In the formula for the epoxide,

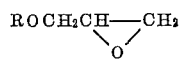

R represents a hydrocarbon group having from 1 to 8 carbon atoms as described hereinabove.

The solution of 3-keto-17-aceto-steroid, iodine and epoxide in a lower-fatty acid is preferably heated at a temperature between about 100° and 150° C. until the iodine has been taken up as evidenced by the change in color of the solution. It is convenient to heat the mixture at the reflux temperature of the solution (about 118° C. for acetic acid and about 140° C. for propionic acid), although lower temperatures can be used if proper mixing of the reactants is provided, and higher temperatures can be used by operating under slightly elevated pressure.

The 4,21-diiodo-steroids produced by this process are useful as intermediates for the preparation of steroids of the adrenal cortical hormone series. For example, when the starting material is pregnane-3,11,20-trione-17αol, iodination by the present invention gives 4,21-diiodopregnane-3,11,20-trione-17α-ol. In the latter substance, the 21-oidine can be replaced by an acyloxy group and the 4-iodine eliminated by dehydrohalogenation to produce a 4,5-double bond, giving an ester of Δ⁴-pregnene-3,11,20-trione-17α,21-diol, which is the important hormone known as cortisone. The 4,21-diiodo-steroid is conveniently converted to a Δ⁴-21-acyloxy-steroid by treating the diiodo-steroid, which need not be isolated, first with a hydrazine compound, H₂NNHR′, and then with a metallic acylate, MOR″.

The hydrazine, H₂NNHR′, can be added either in the free base form or as an acid-addition salt. In either case the hydrazine takes the salt form when added to the acid mixture containing the 4,21-diiodo derivative. The heating of the acidic mixture containing the 4,21-diiodo derivative and the hydrazine causes dehydrohalogenation involving the 4-iodine atom, producing a double bond in the 4,5-position, and at the same time the 3-keto group is largely converted to the hydrazone derivative. The hydrazine used in this step can be hydrazine itself (R'=H), or a substituted hydrazine such as phenylhydrazine (R'=C₆H₅), 2,4-dinitrophenylhydrazine (R'=2,4-(O₂N)₂C₆H₃)

semicarbazide (R'=CH₃CO) and Girard's reagents. It is preferable also to add together with the hydrazine an equivalent amount or slightly more than an equivalent amount of an alkali metal acetate, such as sodium acetate, to neutralize the hydrogen iodide formed during the dehydrohalogenation. A large excess of metallic acetate should be avoided here, however, to prevent replacement of the 4-iodine by an acetoxy group which would compete with the dehydrohalogenation reaction and lower the yield of desired product.

In order to regenerate the free 3-keto compound from the 3-hydrazone derivative, an acid hydrolysis or an exchange reaction is necessary. Acid hydrolysis is accomplished by adding to the reaction mixture after treatment with the hydrazine an acid substantially stronger than acetic or propionic acid and heating the mixture. The strong acid used can be a mineral acid such as hydrochloric or sulfuric acid or a strong organic acid such as oxalic acid. Alternatively, an exchange reaction is effected by heating the steroid hydrazone with a carbonyl compound more reactive with hydrazines than the steroid ketone. The hydrazone of the more reactive carbonyl compound is formed preferentially and the free steroid ketone is regenerated. Such reactive carbonyl compounds include benzaldehyde and pyruvic acid. Pyruvic acid is especially valuable for this purpose, since it is not only a relatively strong acid but also contains a carbonyl group highly reactive with hydrazines.

In order to replace the 21-iodo group by an acyloxy group, the reaction mixture is heated with a large excess of metallic acylate, MOR'', where M represents an equivalent of a cation, preferably an alkali metal, and R'' is an acyl radical derived from a lower-fatty acid, desirably the same as the acid used in the iodination reaction. This step is carried out subsequent to the reaction with a hydrazine to remove the 4-iodine atom, and can be performed either before or after or simultaneously with the regeneration of the steroid ketone from the hydrazone derivative.

The over-all process may be illustrated by the following scheme, using pregnane-3,20-dione as exemplary starting material:

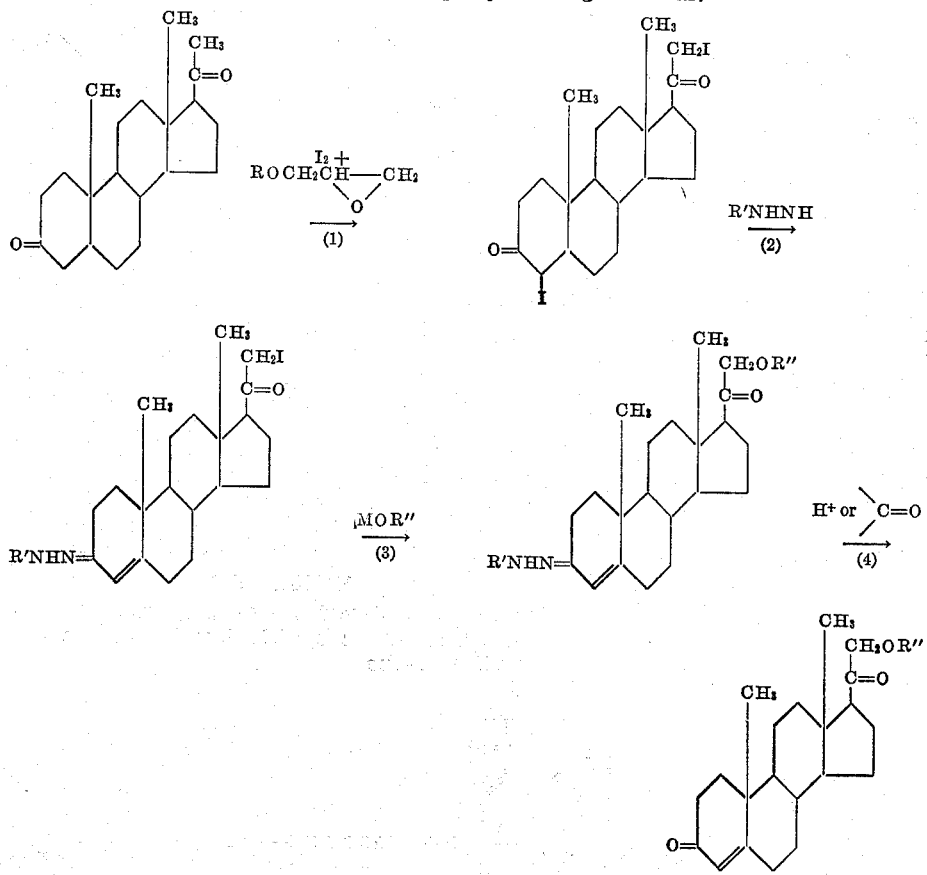

The order of Steps 3 and 4 may be reversed, or the two steps may be carried out simultaneously. It should be emphasized that, although several reactions are involved, the whole process can be carried out all in one reaction vessel and without isolation of any intermediates.

Still another aspect of this invention relates to iodination of 3-keto-steroids in the 2- or 4-position but not in the 21-position. This takes place in the 3-keto-steroids lacking a 21-carbon atom, as in the androgen and etiocholane series, or in 3-keto-steroids in which the 21-position is not activated by an adjacent carbonyl group, as in the sterol and bile acid series, or in which the 21-position is blocked by other substituents. For example, by the process of the invention cho-cholestanone is iodinated to 2-iodo-cholestanone, 3-ketocholanic acid is iodinated to 4-iodo-3-ketocholanic acid, 3-keto-$\Delta^{11}$-cholenic acid is iodinated to 4-iodo-3-keto-$\Delta^{11}$-cholenic acid, androstan-17$\beta$-ol-3-one (allo configuration) is iodinated to 2-iodoandrostan-17$\beta$-ol-3-one, and 3-ketoetiocholanic acid is iodinated to 4-iodo-3-ketoetiocholanic acid.

The following examples will further illustrate our invention but should not be construed as limitative.

mixture was distilled on a steam bath under reduced pressure to remove the acetone, and the residue was mixed with 150 ml. of benzene and 200 ml. of water. The benzene layer was separated, the aqueous layer was extracted with two portions of 50 ml. of benzene, and the benzene extracts were combined with the main benzene layer. After filtering through a cotton plug the benzene solution was distilled under reduced pressure to remove the solvent. The yellow residual liquid was dissolved in 200 ml. of acetone, and the solution was filtered. The filtrate was

EXAMPLE 1

*Iodination of $\Delta^5$-pregnen-3$\beta$-ol-20-one and preparation of 21-actoxy-$\Delta^5$-3$\beta$-ol-20-one*

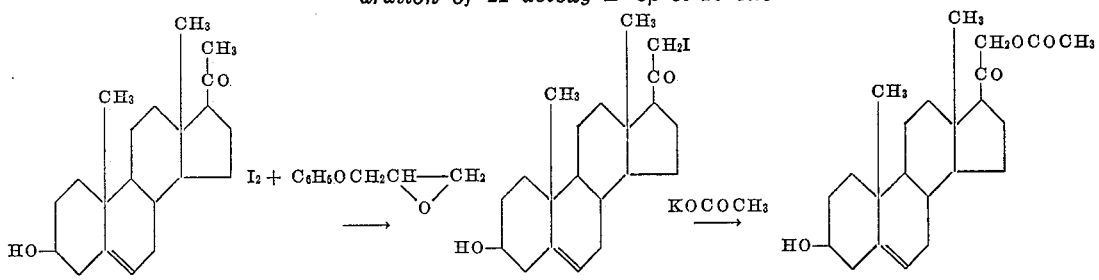

A mixture of 38.0 g. (0.12 mole) of $\Delta^5$-pregnen-3$\beta$-ol-20-one, 30.5 g. (0.12 mole) of powdered iodine, 72.0 g. (0.48 mole) of phenyl glycidyl ether and 1,000 ml. of anhydrous ethyl alcohol (ordinary absolute alcohol which had been dried over sodium and ethyl phthalate according to Fieser, Experiments in Organic Chemistry, 2nd ed., p. 359) was refluxed on a steam bath for about five hours. The resulting pale amber solution was concentrated by removal of the alcohol under reduced pressure, giving a residue of crude 21-iodo-$\Delta^5$-pregnen-3$\beta$-ol-20-one.

The residue of 21-iodo-$\Delta^5$-pregnen-3$\beta$-ol-20-one was dissolved in 600 ml. of acetone and added to a solution of potassium acetate in acetone (prepared by refluxing for fifteen minutes 150 g. 1.5 moles) of potassium bicarbonate and 90 ml. (1.58 moles) of glacial acetic acid in 600 ml. of acetone). The resulting yellow mixture was refluxed for two and one-half hours. A transitory thickening lasting for about one hour occurred after about one-quarter hour of heating. The reaction cooled in an ice bath for an hour and then in an ethylene dichloride-Dry Ice mixture for one-half hour, and the resulting crystallized solid was collected by filtration. After washing with 60 ml. of acetone at 0° C. the white product was dried, giving 25 g. (56%) of 21-acetoxy-$\Delta^5$-pregnen-3$\beta$-ol-20-one, M. P. 179-181° C. After recrystallization from boiling glacial acetic acid (4 ml. per gram), washing with 50% aqueous acetone and drying in a vacuum oven, it had the M. P. 181.3-182.6° C.

The acetone mother liquors were distilled under reduced pressure to remove the solvent. The remaining oil was then subjected to high vacuum distillation at 85-105° C. at a pressure of 0.05-0.15 mm. to remove the majority of the excess phenyl glycidyl ether and the iodohydrin byproduct. A solution of the residue in 60 ml. of acetone gave after cooling about 10% of recovered $\Delta^5$-pregnen-3$\beta$-ol-20-one.

EXAMPLE 2

*Iodination of 3-acetoxy-$\Delta^{5,16}$-pregnadien-20-one and preparation of 3,21-diacetoxy-$\Delta^{5,16}$-pregnadien-20-one*

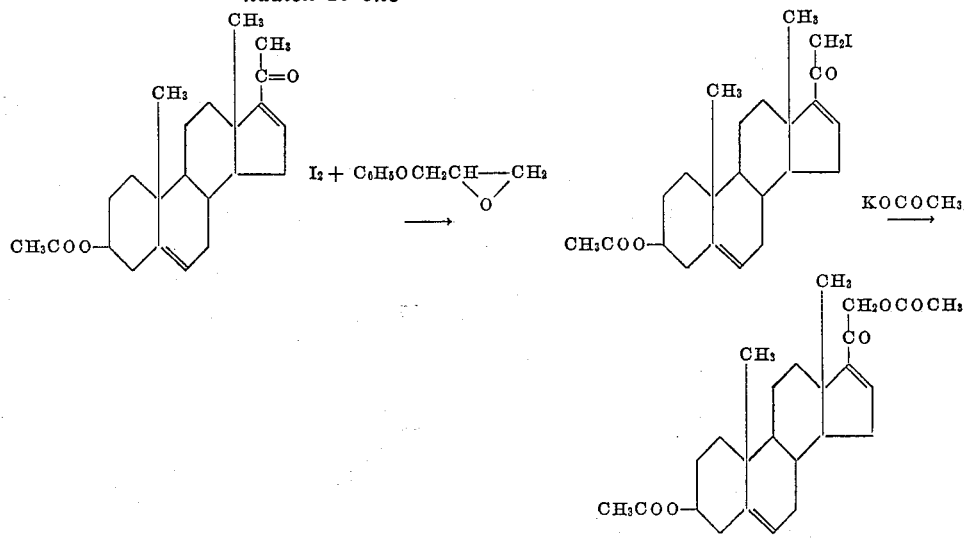

A mixture of 14.26 g. (0.04 mole) of 3-actoxy-$\Delta^{5,16}$-pregnadien-20-one, 10.12 g. (0.04 mole) of iodine, 24.0 g. (0.16 mole) of phenyl glycidyl ether and 40 ml. of anhydrous ethyl alcohol was refluxed for six hours. The iodine color gradually disappeared, and the resulting wine-red colored solution was distilled at reduced pressure to remove the solvent, giving a residue of crude 21-iodo-3-acetoxy-$\Delta^{5,16}$-pregnadien-20-one.

The residue of 21-iodo-3-acetoxy-$\Delta^{5,16}$-pregnadien-20-one was dissolved in a small amount of acetone and added to a solution of potassium acetate (prepared from 50 g. of potassium bicarbonate and 30 ml. of glacial acetic acid in 500 ml. of acetone), and the mixture was refluxed for eight and one-quarter hours. The mixture was then filtered, and the solid which had been filtered off was washed with acetone. The combined filtrates were concentrated, and water and benzene were added to the residue. The benzene layer was separated, and the aqueous layer was further extracted with benzene. The total benzene solution was dried over calcium sulfate, and then all volatile material was removed by distillation in vacuo. The residue was taken up in 100 ml. of dry benzene and diluted with 300 ml. of petroleum ether (Skelly-solve B). The solution was passed through a column of 60 g. of anhydrous aluminum oxide suitable for chromatography, followed by more solvent of the same composition. Concentration of the resulting solutions gave 3,21-diacetoxy-$\Delta^{5,16}$-pregnadien-20-one in the form of needles, M. P. 148–149° C. When recrystallized from petroleum ether it had the M. P. 149.4–151.4° C.; optical rotation $[\alpha]_D^{25} = -26.7°$ (1% in alcohol).

*Anal.*—Calcd. for $C_{25}H_{34}O_5$: C, 72.43; H, 8.27. Found: C, 72.24; H, 8.42.

The residue of 21-iodo-$\Delta^{5,16}$-pregnadien-3$\beta$-ol-20-one was dissolved in a small amount of acetone and added to a solution of potassium acetate (prepared from 25 g. of potassium bicarbonate and 15 ml. of glacial acetic acid in 300 ml. of acetone), and the mixture was refluxed for six hours. The resulting solution was filtered, the filtrate was concentrated, and water and benzene were added to the residue. The benzene layer was separated, and the aqueous layer was extracted with benzene. The total benzene was dried over calcium sulfate and concentrated. The residue was dissolved in 50 ml. of benzene, the solution was diluted with 50 ml. of petroleum ether (Skellysolve B) and passed through a column of 60 g. of anhydrous aluminum oxide suitable for chromatography. The column was eluted successively with 500 ml. of an equal volume mixture of benzene and petroleum ether, 100 ml. of benzene, 100 ml. of an equal volume mixture of benzene and ether, and 300 ml. of acetone. Concentration of the acetone eluates and recrystallization of the resulting crystalline solid three times from methanol gave 21-acetoxy-$\Delta^{5,16}$-pregnadien-3$\beta$-ol-20-one. M. P. 174–177° C.; optical rotation $[\alpha]_D^{25} = -29.3°$ (1% in alcohol).

*Anal.*—Calcd. for $C_{23}H_{32}O_4$: C, 74.16; H, 8.66. Found: C, 74.06; H, 8.84.

A solution of 21-acetoxy-$\Delta^{5,16}$-pregnadien-3$\beta$-ol-20-one, M. P. 165–173° C., obtained by the above reaction, in ethyl acetate was shaken in a hydrogen atmosphere with Raney nickel catalyst. Reduction began at room temperature and was complete at 45° C. The mixture was filtered, the filtrate was concentrated and the residue was recrystallized first from acetone and then from

EXAMPLE 3

*Iodination of $\Delta^{5,16}$-pregnadien-3$\beta$-ol-20-one and preparation of 21-acetoxy-$\Delta^{5,16}$-pregnadien-3$\beta$-ol-20-one*

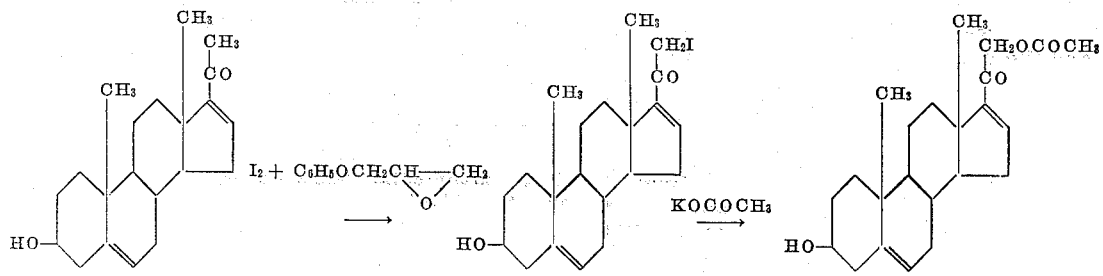

A mixture of 6.28 g. (0.02 mole) of $\Delta^{5,16}$-pregnadien-3$\beta$-ol-20-one, 5.06 g. (0.02 mole) of iodine, 12.0 g. (0.08 mole) of phenyl glycidyl ether and 200 ml. of anhydrous ethyl alcohol was refluxed for about five hours. The resulting mixture was concentrated at reduced pressure to remove the solvent, giving a residue of crude 21-iodo-$\Delta^{5,16}$-pregnadien-3$\beta$-ol-20-one.

an acetic acid-petroleum ether mixture and dried at 100° C. in a vacuum oven, given 21-acetoxy-$\Delta^5$-pregnen-3$\beta$-ol-20-one M. P. 180.6–181.8° C.; optical rotation $[\alpha]_D^{25} = +45.2°$ (1% in alcohol). A mixed melting point with the product obtained in Example 1 showed no depression.

*Anal.*—Calcd. for $C_{23}H_{34}O_4$: C, 73.76; H, 9.15. Found: C, 73.95; H, 9.14.

EXAMPLE 4

*Iodination of pregnane-3$\alpha$,17$\alpha$-diol-11,20-dione and preparation of 21-acetoxypregnane-3$\alpha$,17$\alpha$-diol-11,20-dione*

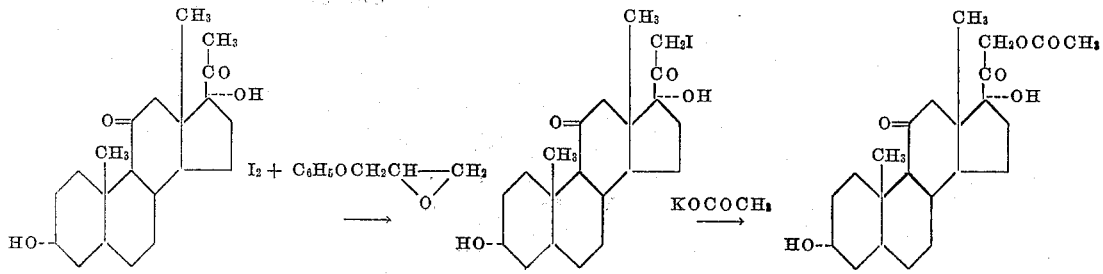

(a) A mixture of 1.74 g. (0.005 mole) of pregnane-3α,17α-diol-11,20-dione, 1.26 g. (0.005 mole) of iodine, 3.0 g. (2.70 ml., 0.02 mole) of phenyl glycidyl ether and 10 ml. of glacial acetic acid was refluxed for twenty minutes. The resulting pale orange-yellow solution, containing 21-iodopregnane-3α,17α-diol-11,20-dione, was carefully poured into a suspension of 16.7 g. (0.167 mole) of potassium bicarbonate in 50 ml. of acetone, and the mixture was refluxed for seven hours. The solution was concentrated by distillation at reduced pressure, and the residue was treated with ethyl acetate and water. The ethyl acetate layer was separated and concentrated to give a viscous yellow oil. The oil was triturated with petroleum ether (Skellysolve B), the petroleum ether decanted and the petroleum ether insoluble fraction was dissolved in 25 ml. of ethanol. When this solution was cooled to 0° C. there crystallized 0.69 g. of 21-acetoxypregnane-3α,17α-diol-11,20-dione, M. P. 210–214° C.

(b) To a solution of 3.48 g. (0.01 mole) of pregnane-3α,17α-diol-11,20-dione in 15 ml. of acetic acid at 15° C. were added 0.05 ml. of 30% hydrogen bromide in acetic acid and 1.68 g. (0.0105 mole) of bromine (3.36 ml. of 0.50 g./ml. of bromine in acetic acid). The bromine color faded after standing at room temperature for about fifteen minutes, and the mixture was then slowly diluted with 150 ml. of water containing 3 g. of potassium acetate. A white precipitate formed and, after cooling in ice for one-half hour, it was filtered and washed with water. The precipitate was dissolved in 100 ml. of acetone containing 4 g. of sodium iodide, and the solution was refluxed for twenty minutes. The solution was filtered into a solution of potassium acetate (prepared from 12.5 g. of potassium bicarbonate and 7.5 ml. of acetic acid in 25 ml. of acetone), and the mixture was refluxed and stirred for twelve hours. Most of the acetone was boiled off, water was added, the mixture stirred at 0° C. and the light brown crystalline solid was collected by filtration, washed with water and dried at 70° C., giving 3.50 g., M. P. 175–185° C. The product was boiled with 25 ml. of ethyl acetate for five minutes, cooled and collected by filtration, giving 2.17 g. of 21-acetoxy-pregnane-3α,17α-diol-11,20-dione, M. P. 207–210° C.; when recrystallized from dilute acetone it had the M. P. 213–214° C. with preliminary softening at 207° C. A mixed melting point with the 21-acetoxypregnane-3α,17α-diol-11,20-dione obtained in part (a) showed no depression.

EXAMPLE 5

*Preparation of 21-acetoxypregnane-3α,71α-diol-11,20-dione*

A mixture of 3.48 g. (0.01 mole) of pregnane-3α,17α-diol-11,20-dione, 2.54 g. (0.01 mole) of powdered iodine, 4.6 g. (4.8 ml., 0.04 mole) of isopropyl glycidyl ether and 10 ml. of glacial acetic acid was refluxed with stirring for ten minutes. The resulting pale yellow-orange solution was carefully poured into a suspension of 20.0 g. of potassium bicarbonate in 100 ml. of acetone. An additional 100 ml. of acetone was used to complete the transfer of the intermediate 21-iodo compound, and the solution was refluxed with stirring for twelve hours. Water (50 ml.) was then added, and the solution was concentrated in vacuo. The residue was dissolved in ethyl acetate, and the ethyl acetate was washed with water, dried over magnesium sulfate and concentrated in vacuo. The residue was dissolved in a mixture of 30 ml. of ether and 30 ml. of petroleum ether (Skellysolve B). Upon standing the product crystallized and was collected by filtration and washed with ether giving 1.95 g. of 21-acetoxypregnane-3α,17α-diol-11,20-dione, M. P. 212–214° C.

EXAMPLE 6

*Iodination of 3α-acetoxypregnane-11,20-dione and preparation of 3α,21-diacetoxypregnane-11,20-dione*

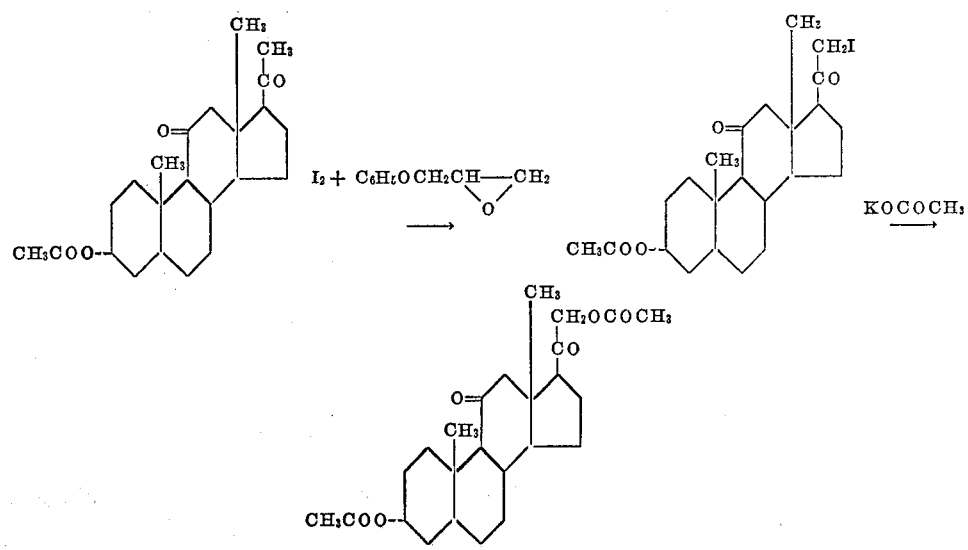

A mixture of 3.75 g. of 3α-acetoxypregnane-11,20-dione, 2.54 g. of powdered iodine, 6.0 g. of phenyl glycidyl ether and 100 ml. of absolute ethyl alcohol was refluxed for six hours. The resulting red-brown solution was concentrated in vacuo, giving a residue of crude 21-iodo-3α-acetoxypregnane-11,20-dione.

The residue of 21-iodo-3α-acetoxypregnane-11,20-dione was heated with a solution of potassium acetate in acetone and worked up by the method described in Example 1. The product thus obtained did not crystallize, and it was further concentrated by distillation in high vacuum. This residue upon treatment with a mixture of acetone and petroleum ether (Skellysolve A) provided crystalline material which when recrystallized from petroleum ether (Skellysolve B) gave white prisms of 3α,21-diacetoxypregnane-11,20-dione, M. P. 105–106° C.

EXAMPLE 7

A mixture of 1.58 g. (0.005 mole) of $\Delta^5$-pregnen-3β-ol-20-one, 1.26 g. (0.005 mole) of powdered iodine, 3.0 g. (2.7 ml., 0.02 mole) of phenyl glycidyl ether and 25 ml. of nitroethane was refluxed with stirring for four and one-half hours. The mixture was concentrated in vacuo, xylene was added to the residue and the whole again concentrated in vacuo. The residual brown oil was refluxed for sixteen hours with a solution of potassium acetate in acetone and worked up by the method described in Example 1. The product when recrystallized three times from acetone gave 21-acetoxy-$\Delta^5$-pregnen-3β-ol-20-one, M. P. 180–182° C.

EXAMPLE 8

*Preparation of 21-propionoxy-$\Delta^5$-pregnen-3β-ol-20-one*

A mixture of 1.58 g. of $\Delta^5$-pregnen-3β-ol-20-one, 1.26 g. of powdered iodine, 3.0 g. of phenyl glycidyl ether and 12 ml. of propionic acid was refluxed with stirring for fifteen minutes. The mixture was then cooled and carefully poured into a suspension of 15.5 g. of potassium bicarbonate in 100 ml. of acetone, and the solution was refluxed with stirring for twelve hours. The mixture was filtered, most of the acetone was removed by concentration of the filtrate in vacuo, ether was added to the remainder, and the ether was washed with water, dried and concentrated in vacuo. The residual orange-yellow oil was taken up in 15 ml. of acetone and cooled to Dry Ice temperature. The resulting crystalline precipitate was collected by filtration and recrystallized from petroleum ether (Skellysolve C), giving a product melting at 134–140° C. After two recrystallizations from acetone, 21-propionoxy-$\Delta^5$-pregnen-3β-ol-20-one was obtained, M. P. 159.7–160.5° C.; optical rotation $[\alpha]_D^{25} = +43.1°$ (2% in alcohol).

*Anal.*—Calcd. for $C_{24}H_{36}O_4$: C, 74.23; H, 9.35. Found: C, 74.13; H, 9.47.

EXAMPLE 9

A mixture of 6.32 g. of $\Delta^5$-pregnen-3β-ol-20-one, 5.08 g. of powdered iodine, 12.0 g. (10.8 ml.) of phenyl glycidyl ether and 200 ml. of absolute ethyl alcohol was refluxed for six hours. The resulting pale orange solution was concentrated in vacuo and refluxed for twenty hours with a solution of potassium propionate in acetone (prepared from 19.5 ml. of propionic acid and 25 g. of potassium bicarbonate in 200 ml. of acetone). Water was then added and the mixture concentrated in vacuo. The residue was dissolved in ethyl acetate and water, and the ethyl acetate was washed with a 2% solution of sodium chloride and dried over sodium sulfate. Concentration of the ethyl acetate solution in vacuo gave an orange oil which was dissolved in a mixture of 50 ml. of acetone and 25 ml. of petroleum ether (Skellysolve B) and cooled to Dry Ice temperature. A crystalline precipitate was obtained which was collected by filtration and dried to give 5.15 g., M. P. 145–150° C. Recrystallization from acetone gave white leaflets of 21-propionoxy-$\Delta^5$-pregnen-3β-ol-20-one, M. P. 155–156° C.

EXAMPLE 10

A mixture of 1.58 g. of $\Delta^5$-pregnen-3β-ol-20-one, 1.26 g. of powdered iodine, 3.0 g. of phenyl glycidyl ether and 50 ml. of n-propyl alcohol was refluxed for six hours. The resulting orange-brown solution was cooled and decanted from a small amount of black tar. A small amount of crystalline precipitate appeared at this point which was filtered and found to be unreacted $\Delta^5$-pregnen-3β-ol-20-one. The filtrate was concentrated in vacuo and treated with a solution of potassium acetate in acetone and worked up by the method described in Example 1 to give 21-acetoxy-$\Delta^5$-pregnen-3β-ol-20-one, M. P. 182–185° C.

Example 11

A mixture of 1.58 g. of $\Delta^5$-pregnen-3β-ol-20-one, 1.26 g. of powdered iodine, 3.2 g. of ethylbutyl glycidyl ether and 10 ml. of glacial acetic acid was refluxed with stirring for about fifteen minutes. The mixture was cooled and carefully poured into a suspension of 16.7 g. of potassium bicarbonate in 100 ml. of acetone, and the whole was refluxed and stirred for twelve hours. The reaction mixture was worked up by the method described in Example 1, and the product was recrystallized several times from acetone to give 21-acetoxy-$\Delta^5$-pregnen-3β-ol-20-one, M. P. 181–183° C.

Example 12

A mixture of 1.58 g. of $\Delta^5$-pregnen-3β-ol-20-one, 1.26 g. of powdered iodine, 2.6 g. of butyl glycidyl ether and 10 ml. of glacial acetic acid was refluxed with stirring for fifteen minutes. The resulting pale yellow solution was carefully poured into a suspension of 16.7 g. of potassium bicarbonate in 100 ml. of acetone, and the whole was refluxed with stirring for twelve hours. The reaction mixture was worked up as described in Example 1, and the product was recrystallized several times from acetone to give 21-acetoxy-$\Delta^5$-pregnen-3β-ol-20-one, M. P. 182–184° C.

Example 13

*Diiodination of pregnane - 3,11,20-trione-17α-ol and preparation of 21-acetoxy-Δ⁴-pregnene-3,11,20-trione-17α-ol (cortisone acetate).*

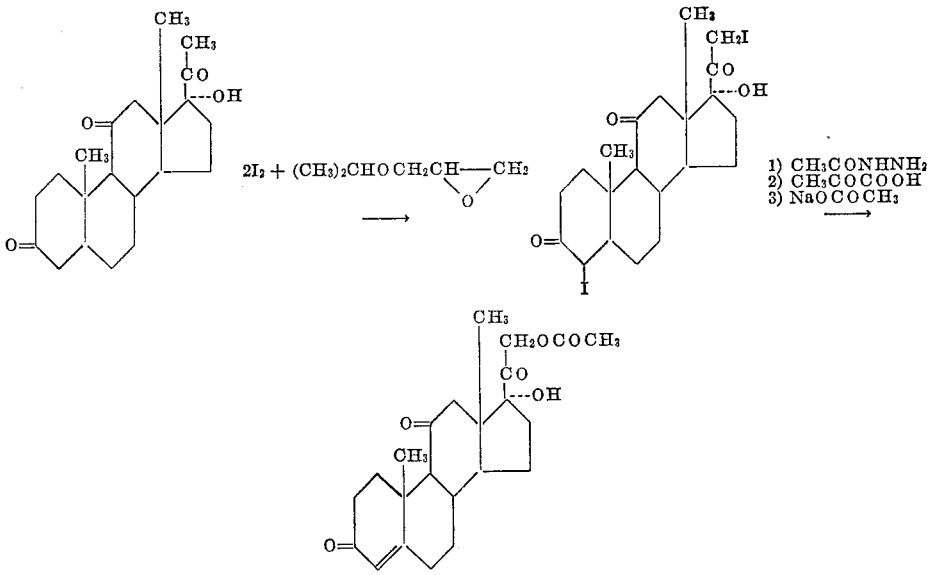

A mixture of 3.46 g. (0.01 mole) of pregnane-3,11,20-trione-17α-ol, 5.08 g. (0.02 mole) of powdered iodine, 9.2 g. (0.08 mole) of isopropyl glycidyl ether and 100 ml. of glacial acetic acid was stirred vigorously and refluxed for twenty minutes. The iodine uptake was complete after ten minutes and the solution containing 4,21-diiodopregnane-3,11,20-trione-17α-ol became deep pink in color.

The mixture containing 4,21-diiodopregnane-3,11,20-trione-17α-ol was cooled to about 40° C., and a solution of 3.5 g. (0.0314 mole) of semicarbazide hydrochloride and 3.5 g. of anhydrous sodium acetate (0.0427 mole) in 10 ml. of water and 50 ml. of glacial acetic acid was added. The mixture was heated to 70° C. for one and one-half hours under an atmosphere of nitrogen. The addition of the semicarbazide hydrochloride and sodium acetate changed the mixture to a deep wine-red color which lightened upon heating, and a finely divided crystalline precipitate appeared within twenty minutes after the addition. A mixture of 12.6 g. of anhydrous sodium aceate and 21 g. of redistilled pyruvic acid in 40 ml. of water was then added and heating was continued at 70° c. for two hours. Most of the acetic acid was removed in vacuo, the residue was agitated with a water-ether mixture, the ether layer was separated and washed with water, 5% sodium carbonate solution and 2% sodium chloride solution and dried over anhydrous sodium sulfate. The ether was removed in vacuo and the residue was concentrated further at 100° C. and 0.1 mm. The resinous residue was triturated with 50 ml. of acetone and the resulting crystals were collected by filtration and washed with ether giving material with M. P. 225–228° C. (sintering at 220° C. and clearing at 234° C.). After two recrystallizations from acetone, the product had the M. P. 242–244° C.; a mixed melting point with authentic cortisone acetate gave no depression. The corrected melting point was 240.6–241.5° C.; $[α]_D^{25} = +203°$ (1% in chloroform); ultraviolet assay showed $E=15,440$ at 238 m$\mu$, and also had pronounced absorption at 280 m$\mu$ which corresponded to a small amount of $Δ^{4,6}$-diene as an impurity.

Example 14

A mixture of 6.92 g. of pregnane-3,11,20-trione-17α-ol, 10.16 g. of powdered iodine, 18.4 g. of isopropyl glycidyl ether and 100 ml. of glacial acetic acid was refluxed with vigorous stirring for forty-five minutes (temperature at reflux=118.5° C.). The mixture, containing 4,21-diiodopregnane - 3,11,20 - trione-17α-ol, was allowed to stand overnight at room temperature and then heated to 75° C. under an atmosphere of nitrogen, and a solution of 6.68 g. of semicarbazide hydrochloride and 5.28 g. of anhydrous sodium acetate in 15 ml. of water and 20 ml. of glacial acetic acid was added. The mixture was heated to 70° C. with stirring under nitrogen for two hours, and then a mixture of 50 g. of pyruvic acid and 40 ml. of water was added and stirring and heating at 70° C. under nitrogen was continued for two hours. Solvents were removed in vacuo, the residue was agitated with water and ethyl acetate, the ethyl acetate was washed with saturated sodium bicarbonate solution and then with 2% sodium chloride solution and dried over sodium sulfate. The ethyl acetate was removed in vacuo and the residual oil was taken up in 100 ml. of acetone and added to a potassium acetate solution (prepared from 400 ml. of acetone, 30 ml. of acetic acid and 25 g. of potassium bicarbonate, refluxed fifteen minutes), and the total mixture was refluxed and stirred for seven hours. Water was added, the acetone removed in vacuo, the residue dissolved in ethyl acetate and the ethyl acetate washed with water, dried and concentrated. The residue was subjected to distillation at 110° C. and 0.05 mm. The resinous distilland was taken up in 25 ml. of ether and cooled to 0° C., and a crystalline product was formed which was collected by filtration and dried at 50° C. giving 1.200 g. of cortisone acetate as a tan brown solid, M. P. 236–239° C.

Example 15

By the methods described in Examples 13 and 14, pregnane-3,11,20-trione can be caused to react with iodine and phenyl glycidyl ether in propionic acid to give 4,21-diiodopregnane-3,11,20- trione, which in turn can be converted to 21-propionoxy-$\Delta^4$-pregnene-3,11,20-trione by first heating with 2,4-dinitrophenylhydrazine and then with an excess of sodium propionate, followed by heating with pyruvic acid.

*Example 16*

By the methods described in Examples 13 and 14, $\Delta^{16}$-pregnene-3,20-dione can be caused to react with iodine and allyl glycidyl ether in acetic acid to give 4,21-diiodo-$\Delta^{16}$-pregnene-3,20-dione, which in turn can be converted to 21-acetoxy-$\Delta^{4,16}$-pregnadiene-3,20-dione by first heating with semicarbazide, heating with pyruvic acid, and then heating with an excess of potassium acetate.

*Example 17*

By the methods described in Examples 13 and 14, pregnane-3,20-dione-12-ol can be caused to react with iodine and ethylbutyl glycidyl ether in acetic acid to give 4,21-diiodpregnane-3,20-dione-12-ol, which in turn can be converted to 21-acetoxy-$\Delta^4$-pregnene-3,20-dione-12-ol by first heating with semicarbazide, heating with pyruvic acid, and then heating with an excess of sodium acetate.

EXAMPLE 18

By the methods described in Examples 1–12, cholestanone can be caused to react with iodine and a glycidyl ether to give a 2-iodocholestanone.

EXAMPLE 19

By the methods described in Examples 1–12, 3-ketocholanic acid can be caused to react with iodine and a glycidyl ether to give 4-iodo-3-keto-cholanic acid.

EXAMPLE 20

By the methods described in Examples 1–12, 3-keto-$\Delta^{11}$-cholenic acid can be caused to react with iodine and a glycidyl ether to give 4-iodo-3-keto-$\Delta^{11}$-cholenic acid.

EXAMPLE 21

By the methods described in Examples 1–12, androstan-17$\beta$-ol-3-one (allo configuration) can be caused to react with iodine and a glycidyl ether to give a 2-iodoandrostan-17$\beta$-ol-3-one.

EXAMPLE 22

By the methods described in Examples 1–12, 3-ketoetiocholanic acid can be caused to react with iodine and a glycidyl ether to give 4-iodo-3-keto-etiocholanic acid.

We claim:
1. The process for iodinating a keto-steroid in a position alpha to a keto group and wherein the alpha carbon atom to be substituted by iodine bears at least two hydrogen atoms, which comprises heating said keto-steroid between about 50° C. and 150° C. with elementary iodine and an excess of an epoxide,

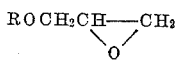

wherein R is a hydrocarbon radical having from 1 to 8 carbon atoms, in an anhydrous polar solvent inert to iodine and epoxides.

2. The process for iodinating a steroid in the 21-position which comprises heating between about 50° C. and 150° C. a 20-keto-steroid having at least two hydrogen atoms in the 21-position with elementary iodine and an excess of an epoxide,

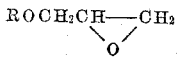

wherein R is a hydrogen radical having from 1 to 8 carbon atoms, in an anhydrous polar organic solvent inert to iodine and epoxides.

3. The process for iodinating $\Delta^5$-pregnen-3$\beta$-ol-20-one in the 21-position which comprises heating between about 50° C. and 150° C. $\Delta^5$-pregnen-3$\beta$-ol-20-one with about one mole of elementary iodine and an excess of an epoxide,

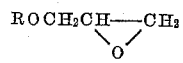

wherein R is a hydrocarbon radical having from 1 to 8 carbon atoms, in an anhydrous polar organic solvent inert to iodine and epoxides.

4. The process for iodinating $\Delta^5$-pregnen-3$\beta$-ol-20-one in the 21-position which comprises heating between about 50° C. and 150° C. $\Delta^5$-pregnen-3$\beta$-ol-20-one with about one mole of elementary iodine and an excess of an epoxide,

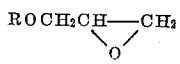

wherein R is a hydrocarbon radical having from 1 to 8 carbon atoms, in anhydrous ethyl alcohol.

5. The process for iodinating $\Delta^5$-pregnen-3$\beta$-ol-20-one in the 21-position which comprises heating between about 50° C. and 150° C. $\Delta^5$-pregnen-3$\beta$-ol-20-one with about one mole of elementary iodine and about four moles of phenyl glycidyl ether in anhydrous ethyl alcohol.

6. The process for iodinating $\Delta^{5,16}$-pregnadien-3$\beta$-ol-20-one in the 21-position which comprises heating between about 50° C. and 150° C. $\Delta^{5,16}$-pregnadien-3$\beta$-ol-20-one with about one mole of elementary iodine and an excess of phenyl glycidyl ether in anhydrous ethyl alcohol.

7. The process for iodinating pregnane-3$\alpha$,17$\alpha$-diol-11,20-dione in the 21-position which comprises heating between about 50° C. and 150° C. pregnane-3$\alpha$,17$\alpha$-diol-11,20-dione with about one mole of elementary iodine and an excess of an epoxide,

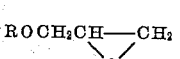

wherein R is a hydrocarbon radical having from 1 to 8 carbon atoms, in an anhydrous lower-fatty acid having from 2 to 3 carbon atoms.

8. The process for iodinating pregnane-3$\alpha$,17$\alpha$-diol-11,20-dione in the 21-position which comprises heating between about 50° C. and 150° C. pregnane-3$\alpha$,17$\alpha$-diol-11,20-dione with about one mole of elementary iodine and an excess of phenyl glycidyl ether in anhydrous acetic acid.

9. The process for iodinating pregnane-3$\alpha$,17$\alpha$-diol-11,20-dione in the 21-position which comprises heating between about 50° C. and 150° C. pregnane-3$\alpha$,17$\alpha$-diol-11,20-dione with about one mole of elementary iodine and an excess of isopropyl glycidyl ether in anhydrous acetic acid.

10. The process for iodinating 3$\alpha$-acetoxypregnane-11,20-dione in the 21-position which comprises heating between about 50° C. and 150° C. 3$\alpha$-acetoxypregnane-11,20-dione with about one mole of elementary iodine and an excess of an epoxide,

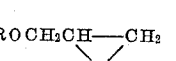

wherein R is a hydrocarbon radical having from 1 to 8 carbon atoms, in an anhydrous alkanol having from 2 to 3 carbon atoms.

11. The process for iodinating 3$\alpha$-acetoxypregnane-11,20-dione in the 21-position which comprises heating between about 50° C. and 150° C. 3$\alpha$-acetoxypregnane-11,20-dione with about one mole of elementary iodine and an excess of phenyl glycidyl ether in anhydrous ethyl alcohol.

12. The process for iodinating in the 21-position and the 4-position a 3-keto-steroid of the normal series having an aceto group in the 17-position and saturated in the 4,5-position, which comprises heating said 3-keto-steroid at a temperature between about 100° C. and about 150° C. with about two moles of elementary iodine and at least two moles of an epoxide having the formula,

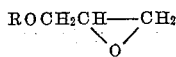

wherein R is a hydrocarbon radical having from 1 to 8 carbon atoms, in the presence of a lower-fatty acid having from 2 to 3 carbon atoms.

13. The process for iodinating in the 21-position and the 4-position pregnane-3,11,20-dione-17α-ol which comprises heating said steroid at a temperature between about 100° C. and about 150° C. with about two moles of elementary iodine and at least two moles of an epoxide having the formula,

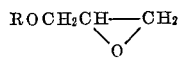

wherein R is a hydrocarbon radical having from 1 to 8 carbon atoms, in the presence of a lower-fatty acid having from 2 to 3 carbon atoms.

14. The process for iodinating in the 21-position and the 4-position pregnane-3,11,20-trione-17α-ol which comprises heating said steroid at a temperature between about 100° C. and 150° C. with about two moles of elementary iodine and at least two moles of isopropyl glycidyl ether in the presence of acetic acid.

15. 4,21 - diiodopregnane-3,11,20-trione-17α-ol, having the formula

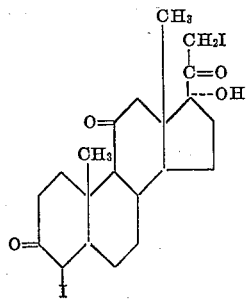

16. 4,21 - diiodopregnane-3,11,20-trione, having the formula

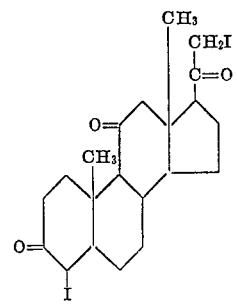

17. 4,21-diiodo-$\Delta^{16}$-pregnene-3,20-dione, having the formula

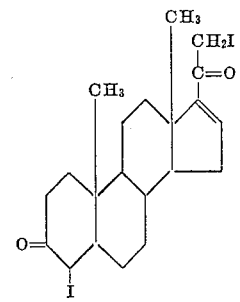

18. 4,21-diiodopregnane-3,20-dione-12-ol, having the formula

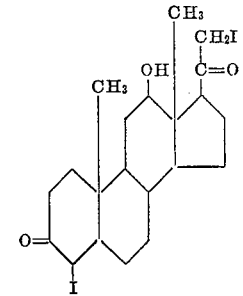

References Cited in the file of this patent

UNITED STATES PATENTS

| Number | Name | Date |
|---|---|---|
| 2,232,730 | Reichstein | Feb. 25, 1941 |